(12) United States Patent
Tu et al.

(10) Patent No.: US 10,755,223 B2
(45) Date of Patent: Aug. 25, 2020

(54) LOGISTIC STATION AND METHOD FOR LOGISTIC

(71) Applicant: INDUSTRIAL TECHNOLOGY RESEARCH INSTITUTE, Hsinchu (TW)

(72) Inventors: Chao-Hui Tu, Taoyuan (TW); Ching-Tsung Cheng, New Taipei (TW); Yung-Ping Tien, New Taipei (TW); Yong-Ren Li, Taichung (TW); Wei-Syuan Syu, Taoyuan (TW); Yan-Ling Liao, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 756 days.

(21) Appl. No.: 15/392,941

(22) Filed: Dec. 28, 2016

(65) Prior Publication Data

US 2018/0181902 A1    Jun. 28, 2018

(30) Foreign Application Priority Data

Dec. 28, 2016   (TW) .............................. 105143598 A

(51) Int. Cl.
*G06Q 10/08* (2012.01)
(52) U.S. Cl.
CPC .................................. *G06Q 10/083* (2013.01)
(58) Field of Classification Search
CPC .. G06Q 10/08; G06Q 10/0836; G06Q 10/087; G06Q 50/28; G06Q 50/32;
(Continued)

(56) References Cited

U.S. PATENT DOCUMENTS

| 4,836,352 A | 6/1989 | Tateno et al. |
| 8,380,006 B2 | 2/2013 | Lee et al. |
| (Continued) |

FOREIGN PATENT DOCUMENTS

| CN | 201285558 Y | 8/2009 |
| CN | 101930593 A | 12/2010 |
| (Continued) |

OTHER PUBLICATIONS

Home Delivery vs Parcel Lockers: an economic and environmental assessment, Maria Giuffrida, 2012, p. 1-2 (Year: 2012).*
(Continued)

*Primary Examiner* — George Chen
*Assistant Examiner* — Ibrahim N El-Bathy
(74) *Attorney, Agent, or Firm* — Maschoff Brennan

(57) ABSTRACT

A logistic station includes a cabinet, a storage boxes in the cabinet, a volume measurement room, a volume measurement system, a user interface and a controller. The volume measurement room has a bottom plate and a ceiling. The volume measurement system in the volume measurement room measures the volume of a consignment. The volume measurement room includes a rangefinder and an image capturing device. The rangefinder on the ceiling measures the height of the consignment placed on the bottom plate. The image capturing device is disposed on the ceiling and captures an image toward the bottom plate. The user interface disposed in the cabinet displays information and receives shipping information and a shipping fee. The controller calculates the volume information according to the image and the height, calculates the shipping fee according to the volume information and the shipping information, and controls one of the storage boxes to open.

20 Claims, 16 Drawing Sheets

(58) Field of Classification Search
CPC ......... G06Q 10/06315; G06Q 10/0832; G06Q 20/20; G06Q 20/208; G06Q 30/018; G06Q 30/0633; G06Q 10/083
See application file for complete search history.

(56) References Cited

U.S. PATENT DOCUMENTS

| | | | |
|---|---|---|---|
| 10,157,362 B1* | 12/2018 | Johansson | G06Q 30/0633 |
| 2008/0133372 A1* | 6/2008 | Ramsden | G01G 19/005 |
| | | | 705/17 |
| 2009/0114041 A1* | 5/2009 | Harish | G06Q 10/087 |
| | | | 73/862.626 |
| 2010/0315526 A1* | 12/2010 | Nakano | G03B 13/36 |
| | | | 348/222.1 |
| 2013/0261792 A1* | 10/2013 | Gupta | G06Q 10/08 |
| | | | 700/232 |
| 2015/0159837 A1* | 6/2015 | Tai | G02B 6/0036 |
| | | | 362/311.02 |
| 2015/0186840 A1 | 7/2015 | Torres et al. | |
| 2015/0193733 A1* | 7/2015 | Bouzit-Benbernou | |
| | | | A47G 29/141 |
| | | | 705/332 |
| 2016/0025549 A1 | 1/2016 | Motoyama | |
| 2016/0027261 A1* | 1/2016 | Motoyama | G06Q 10/04 |
| | | | 340/313 |
| 2016/0307203 A1 | 10/2016 | Roizin et al. | |
| 2017/0116571 A1* | 4/2017 | Tammattabattula | |
| | | | G06Q 10/0835 |

FOREIGN PATENT DOCUMENTS

| | | |
|---|---|---|
| CN | 102313514 A | 1/2012 |
| CN | 102637326 A | 8/2012 |
| CN | 104134244 A | 11/2014 |
| CN | 105277120 A | 1/2016 |
| CN | 105534082 A | 5/2016 |
| TW | 131202 | 3/1990 |
| TW | 201528165 A | 7/2015 |
| TW | I494538 B | 8/2015 |
| TW | I546037 B | 8/2016 |
| WO | 2016/138523 A1 | 9/2016 |

OTHER PUBLICATIONS

TW Office Action dated Dec. 12, 2017 as received in Application No. 105143598.
CN Office Action in Application No. 201710067066.6 dated Jan. 14, 2020.

* cited by examiner

LOGISTIC STATION AND METHOD FOR LOGISTIC

TECHNICAL FIELD

The invention relates to a logistic station and a consignment method for logistic.

BACKGROUND

Freight transport, called logistics, is a common service for people. For example, gift giving, online auction and online shopping are involved in home delivery so that the improvement of logistics business carriers rapidly increases. Generally, the logistics business carrier cooperates with convenience stores. However, the convenience stores may not be located in the remote districts. If the logistics business carrier installs the logistic stations in the remote districts, the labor cost might exceed the profit. In addition, under the cooperation with the convenience stores, the user (consigner) needs to fill a booking note so the personal information of the user may be leaked. When a consumer needs to send or return goods, the consumer has to bring the goods to the freight station in person; however, they are restricted to the opening hours of the freight station. Alternatively, the consumer can turn to a logistics staff to collect the goods, but appointment and payment in advance are required. The difficulties in coordinating time and place are the dawn of the development of self-service.

The self-service for sending goods, at the moment, takes the weight or the size as the standard of measurement. Hence, the logistics staff needs to be present or the consumer needs to implement the transaction in the freight station. The demands of the logistics business carrier cannot be fulfilled in the above situations. The consumer has to match up the working routes of the logistics staff or the opening hours of the freight station when he/she needs to send or return goods. The costs and time are two conditions under consideration.

SUMMARY

A purpose of one or more embodiments of the invention is to provide a logistic station to decrease labor cost for installing the logistic station of a logistics business carrier.

Another purpose of one or more embodiments of the invention is to provide a self-service goods cabinet, processing system and the method thereof. By means of systematized processing, a consumer is able to send a package by himself/herself. For example, the tasks of goods transport, including letters, express delivery packages, maintenance products, returned goods and other task, do not need to involve with the manpower.

Yet another purpose of one or more embodiments of the invention is that logistics or home delivery business carriers is able to collect many packages at a time so as to decrease the costs of logistics, labors and time.

Yet another purpose of one or more embodiments of the invention is to complete the procedures of interfacing with the logistics business carrier by determining the suitable position for placing the goods by measuring the volume of the goods.

According to one or more embodiments of the invention, a logistic station includes a cabinet, storage boxes disposed in the cabinet, a volume measurement room, a volume measurement system disposed in the volume measurement room, a user interface and a controller. The volume measurement room has a bottom plate and a ceiling. The volume measurement system is configured to measure the volume of a consignment and includes a rangefinder and an image capturing device. The bottom plate is used to place the consignment. The ceiling is disposed opposite to the bottom plate. The rangefinder is disposed on the ceiling and is configured to measure the height of the consignment. The image capturing device is disposed on the ceiling and captures an image toward the bottom plate. The user interface is disposed in the cabinet and is configured to display information and receive shipping information and a shipping fee. The controller is electrically connected to the volume measurement system and the user interface, calculates the volume information of the consignment according to the image and the height, calculates the shipping fee according to the volume information and the shipping information, and controls one of the storage boxes to open, according to the volume information, for receiving the consignment.

According to one or more embodiments of the invention, a consignment method for logistic is applied to a logistic station which has a volume measurement system. The consignment method includes: inputting shipping information and printing a label; placing a consignment at the volume measurement system; measuring a height of the consignment and capturing an image of the consignment by the volume measurement system; calculating volume information of the consignment according to the height and the image; calculating a shipping fee according to the volume information and the shipping information; opening one of storage boxes of the logistic station according to the volume information for accommodating the consignment; confirming whether the shipping fee is received; and when the shipping fee is received, locking the storage box to complete a consignment process.

In view of the logistic station provided in one or more embodiments of the invention, the calculations of the volume and the shipping fee are able to be automatically completed, so that the functions of the logistic station can be provided and the logistics business carriers need not to accredit permanent workers any longer. Therefore, the installment costs of the logistic stations can be decreased.

The above description of the summary of this invention and the description of the following embodiments are provided to illustrate and explain the spirit and principles of this invention, and to provide further explanation of the scope of this invention.

DETAILED DESCRIPTION

The detailed features and advantages of the invention will be described in detail in the following description, which is intended to enable any person having ordinary skill in the art to understand the technical aspects of the present invention and to practice it. In accordance with the teachings, claims and the drawings of the invention, any person having ordinary skill in the art is able to readily understand the objectives and advantages of the invention. The following embodiments illustrate the invention in further detail, but the scope of the invention is not limited by any point of view.

Figure 1:
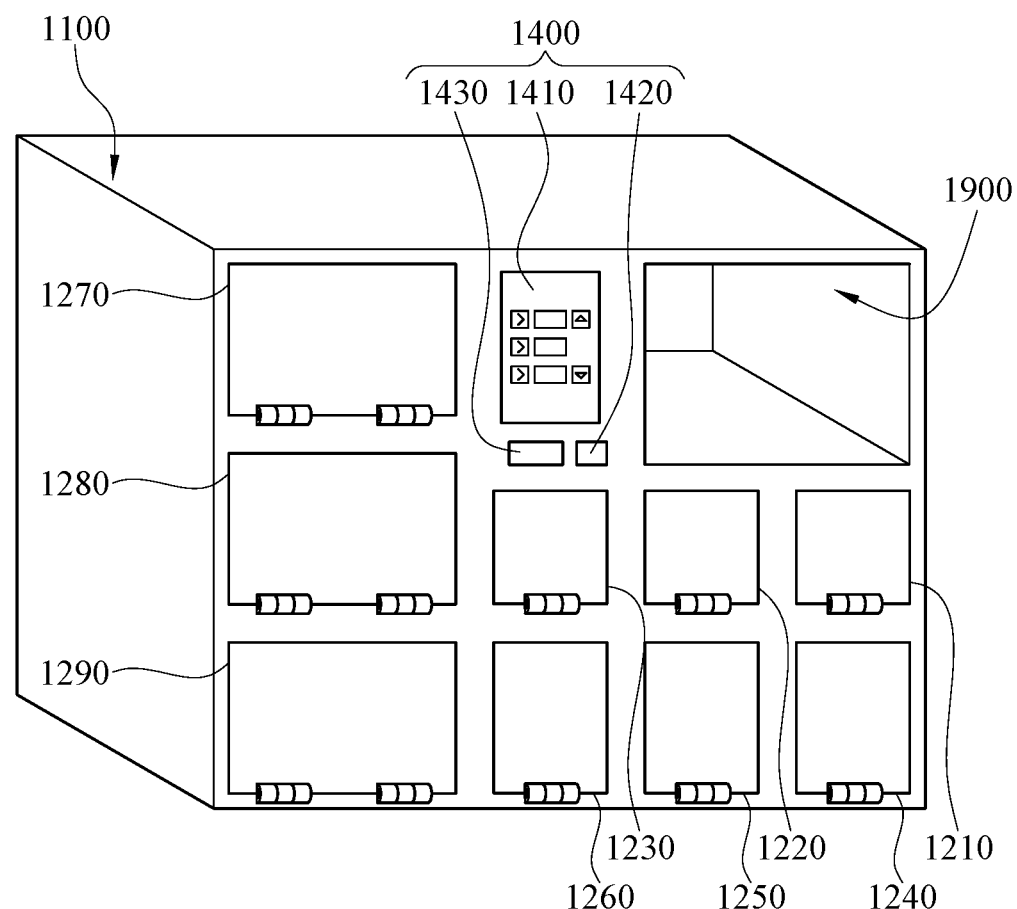
FIG. 1 is a structural diagram of a logistic station in an embodiment of this invention.
Figure 2:
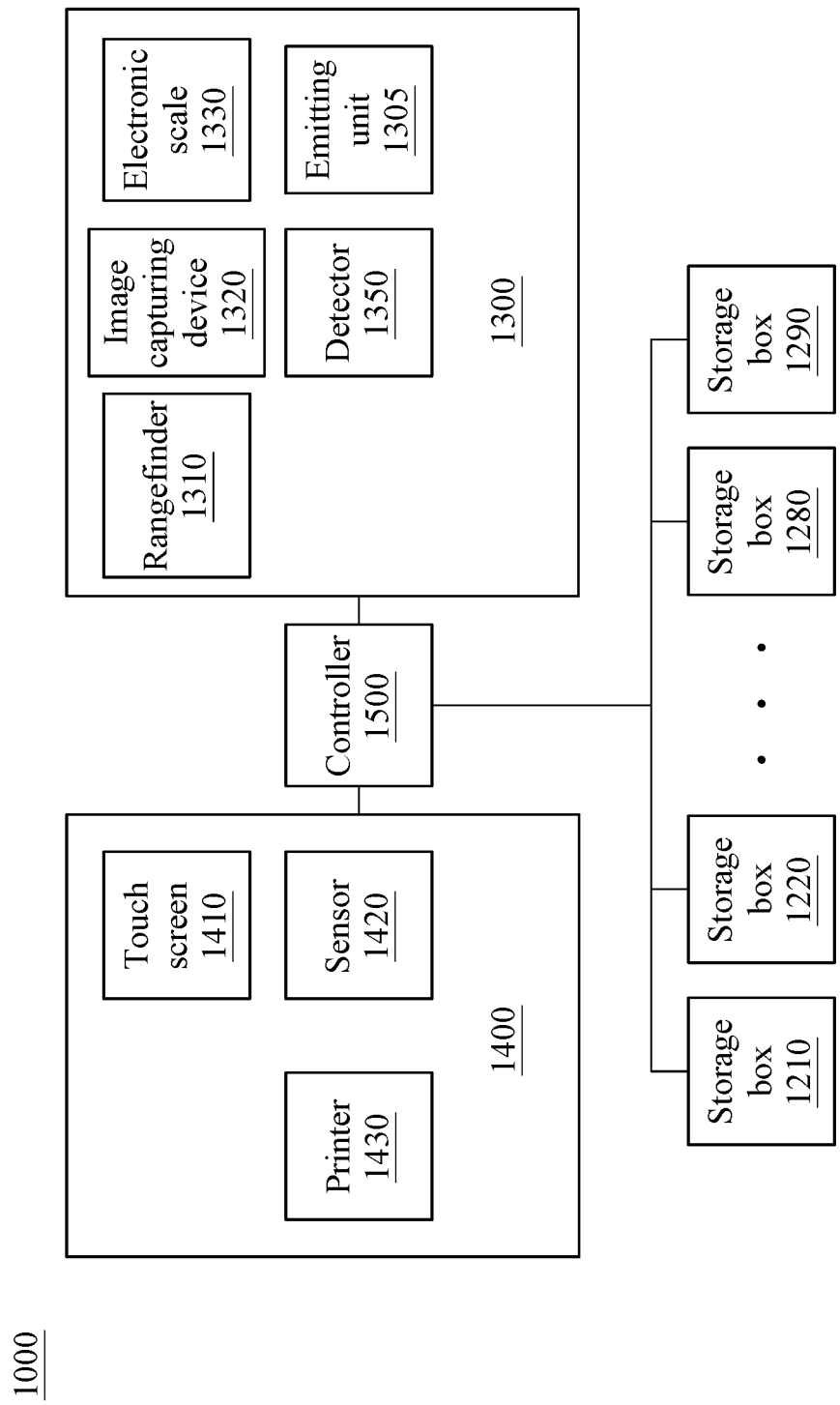
FIG. 2 is a functional block diagram of a logistic station in an embodiment of this invention.
Figure 3:
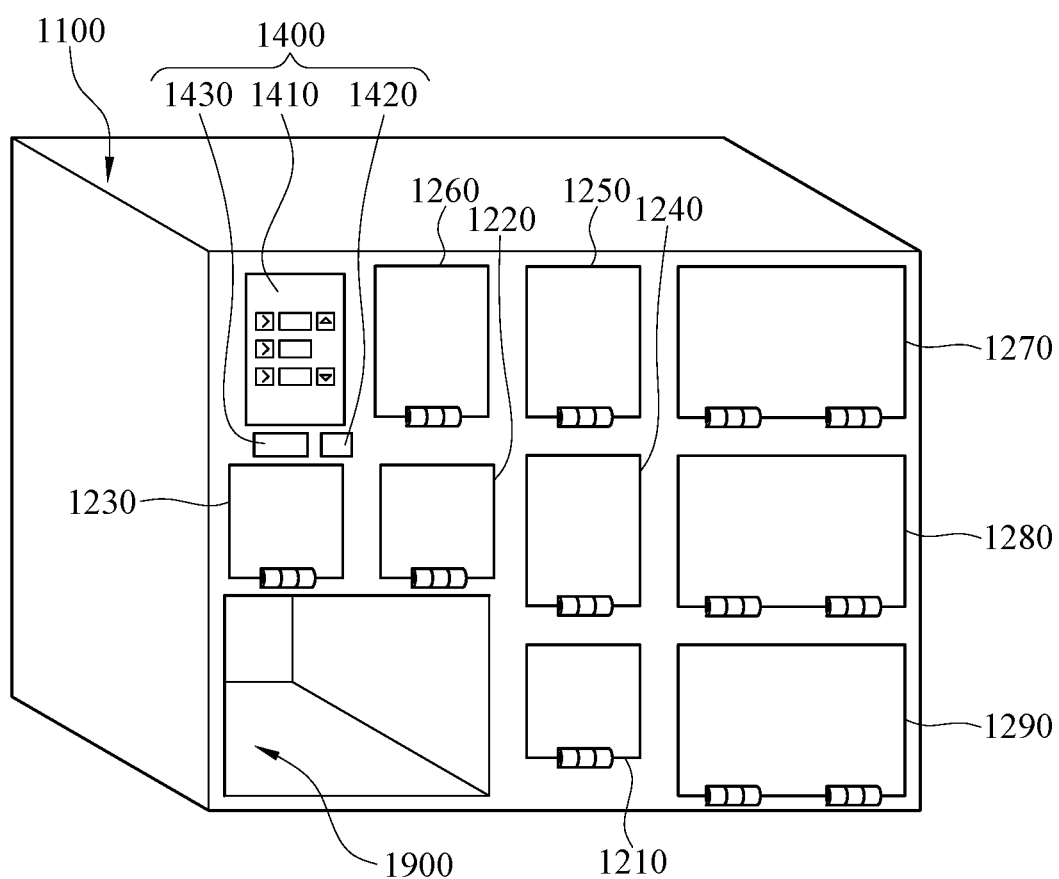
FIG. 3 is a structural diagram of a logistic station in another embodiment of this invention.

Please refer to FIG. 1 and FIG. 2 wherein FIG. 1 is a structural diagram of a logistic station in an embodiment of the invention and FIG. 2 is a functional block diagram of a logistic station in an embodiment of this invention. As shown in FIG. 1 and FIG. 2, the logistic station 1000 has a cabinet 1100, a number of storage boxes 1210-1290 disposed in the cabinet 1100, a volume measurement system 1300, a user interface 1400, a controller 1500 and a volume measurement room 1900. The user interface 1400 and the volume measurement room 1900 are disposed at suitable positions of the cabinet 1100, which are not limited in this invention. In an embodiment, the storage boxes 1210-1290 are disposed in the bottom region of the cabinet 1100, and the user interface 1400 and the volume measurement room 1900 are disposed above the storage boxes, as shown in FIG. 1. In another embodiment, please refer to FIG. 3, which is a structural diagram of a logistic station in another embodiment of the invention. As shown in FIG. 3, the storage boxes 1210-1290 are disposed in the right region of the cabinet 1100, and the user interface 1400 and the volume measurement room 1900 are disposed in the left region of the cabinet 1100. The function of every component is described in the following statement.

As shown in FIG. 2, a consignment, a consigner, a consignee or other basic information can be input by a touch screen 1410 and be stored into the controller 1500. The controller 1500 includes a memory, a microcontroller (central processing unit, CPU), an input/output (I/O) communication interface and/or other device. The microcontroller includes a volume calculator, a weight detector, a processor for basic information label, a detection component and/or other component. The microcontroller is able to execute an operation of software based on the above hardware. A rangefinder 1310, an image capturing device 1320, an electronic scale 1330, detectors 1350, an light emitting unit 1305 and/or other device transmits the information of the volume calculator, the weight detector, the processor for basic information label and/or the detection component to the microcontroller for calculation, measurement, detection and/or other process. In an embodiment, the memory of the controller 1500 records whether each of the storage boxes 1210-1290 has the consignment 2000 in order to control one or more storage boxes, in which nothing is stored, of the storage boxes 1210-1290 to open, so that the consignment 2000 can be placed in the storage box with a suitable size.

The storage boxes 1210-1290 are configured to store the consignment. In an embodiment, the sizes of each of the storage boxes 1210-1230 is 30 cm*30 cm*20 cm, which can accommodate No. 6 box of T-cat Express Delivery Service. The size of each of the storage boxes 1240-1260 is 40 cm*30 cm*30 cm, which can accommodate No. 9 box of T-cat Express Delivery Service. The size of each of the storage boxes 1270-1290 is 60 cm*40 cm*40 cm, which can accommodate No. 12 box of T-cat Express Delivery Service. The above description is for explaining that the size of the storage boxes can be various, but does not intend to limit the size and the number of the storage boxes, and the brand and the type of the placed goods. Each of the storage boxes 1210-1290 has an electronic lock and the controller 1500 controls the electronic to be locked or unlocked. One or more embodiments of this invention are applied to an object (consignment) which is a square, rectangle or other similar shape.

Figure 4A:
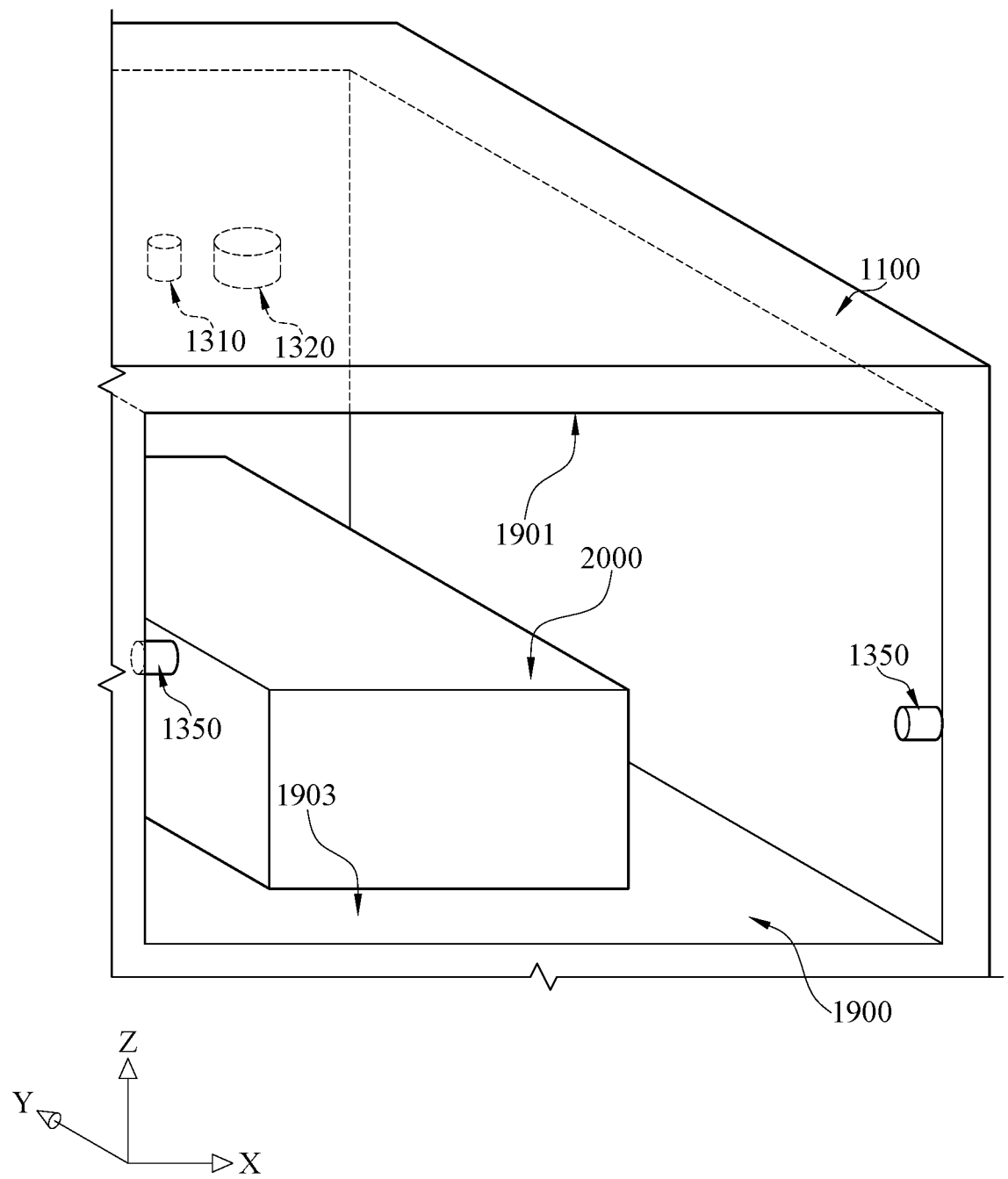
FIG. 4A is a structural diagram of a volume measurement system in an embodiment of this invention.
Figure 4B:
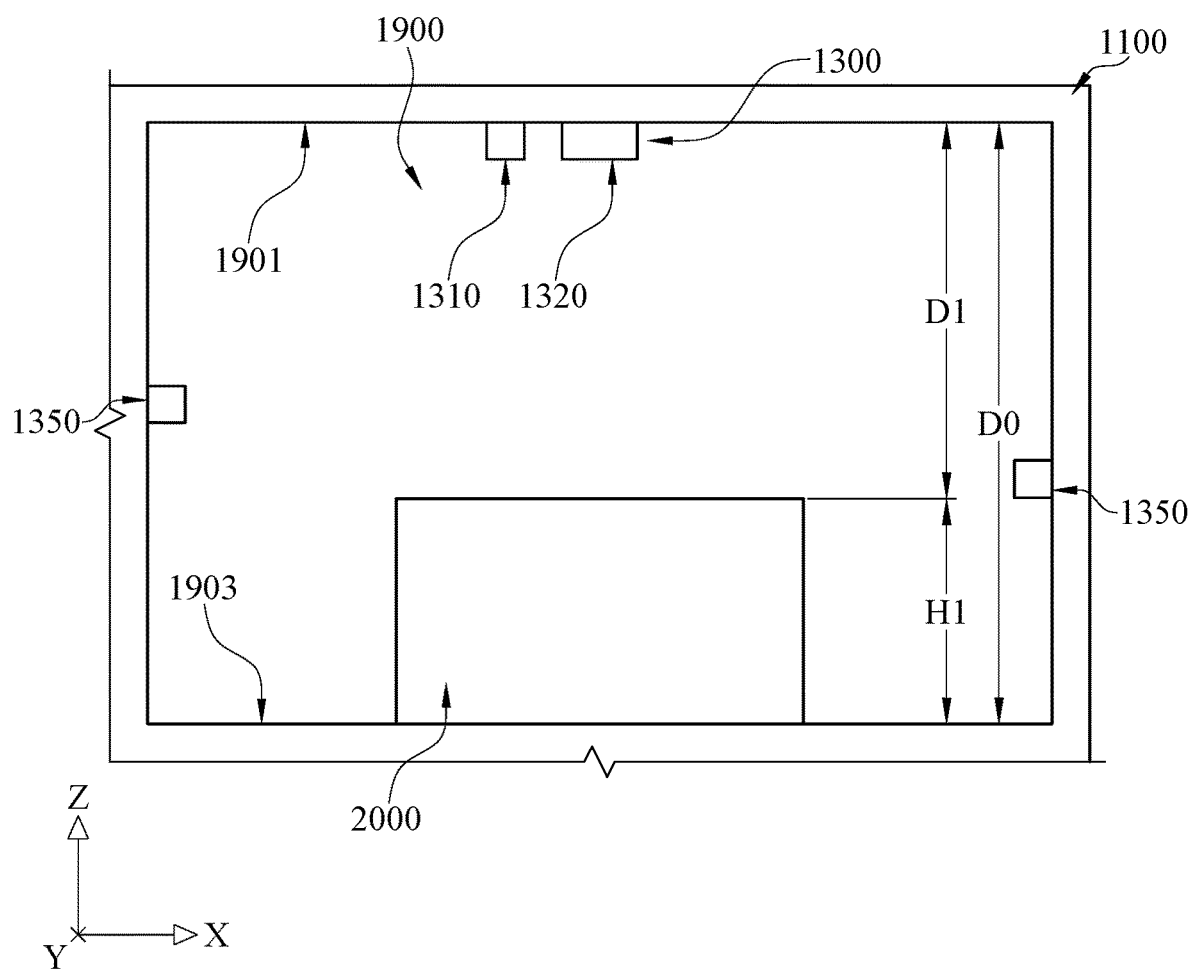
FIG. 4B is a lateral view, from the xz-plane toward the positive y direction, of the volume measurement system in FIG. 4A.
Figure 4C:
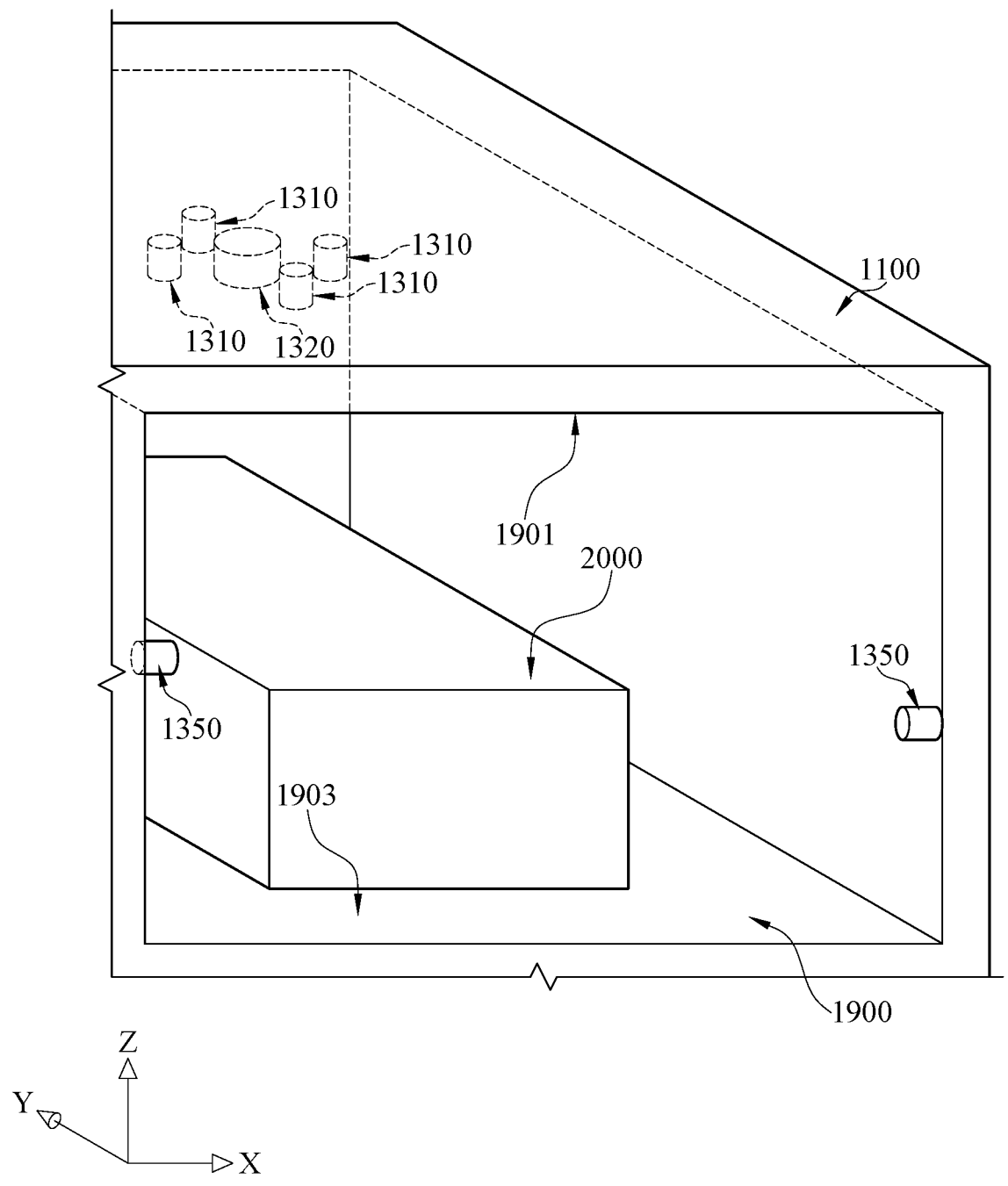
FIG. 4C is a structural diagram of a volume measurement system in another embodiment of this invention.

The volume measurement system 1300 is disposed in the volume measurement room 1900 in which the consignment 2000 is measured. Please refer to FIG. 4A and FIG. 4B wherein FIG. 4A is a structural diagram of a volume measurement system in an embodiment of the invention, and FIG. 4B is a lateral view, from the xz-plane toward the positivey direction, of the volume measurement system in FIG. 4A. As shown in FIG. 4A and FIG. 4B, in an embodiment, the volume measurement system 1300 is disposed in the cabinet 1100 and has a rangefinder 1310, and an image capturing device 1320 which are disposed on the ceiling 1901 of the volume measurement room 1900. The rangefinder 1310 is configured to measure the height of the consignment 2000 which is placed at the bottom plate 1903 of the volume measurement room 1900. There is a distance D0 between the bottom plate 1903 and the ceiling 1901 of the volume measurement room 1900. In advance, the rangefinder 1310 measures the distance D1 between the upper surface of the consignment 2000 and the ceiling 1901, and then the distance D0 minus the distance D1 leaves the height H1 of the consignment 2000. In an embodiment, the rangefinder 1310 of the volume measurement system 1300 is a laser rangefinder. In another embodiment, as shown in FIG. 4C which is a structural diagram of a volume measurement system in another embodiment of the invention, the rangefinder 1310 includes a number of laser rangefinders so that the rangefinder 1310 is able to take multiple measurement of the consignment in order to confirm the height of the consignment.

Figure 5A:
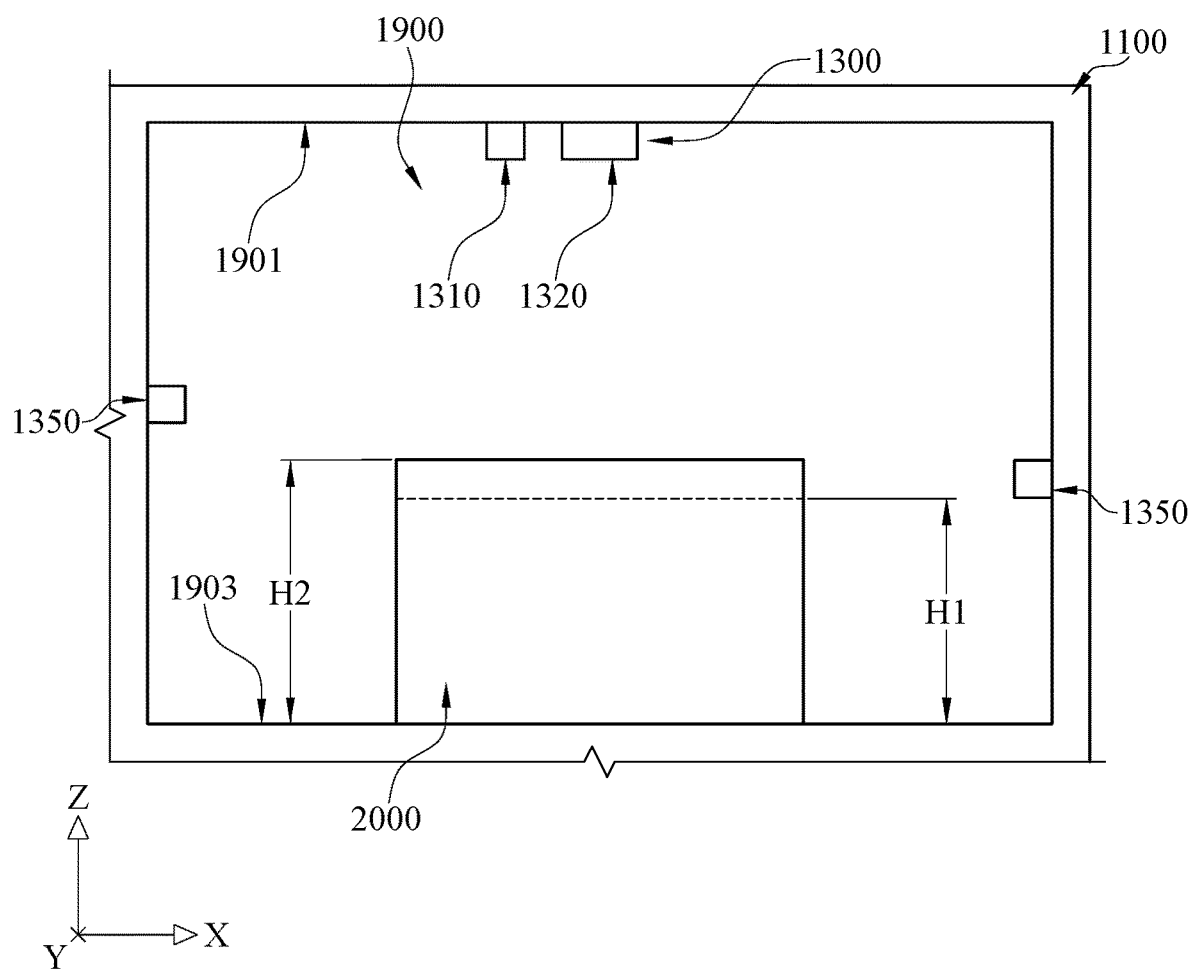
FIG. 5A is a schematic diagram of relation between an image capturing device and a consignment in an embodiment of this invention.
Figure 5B:
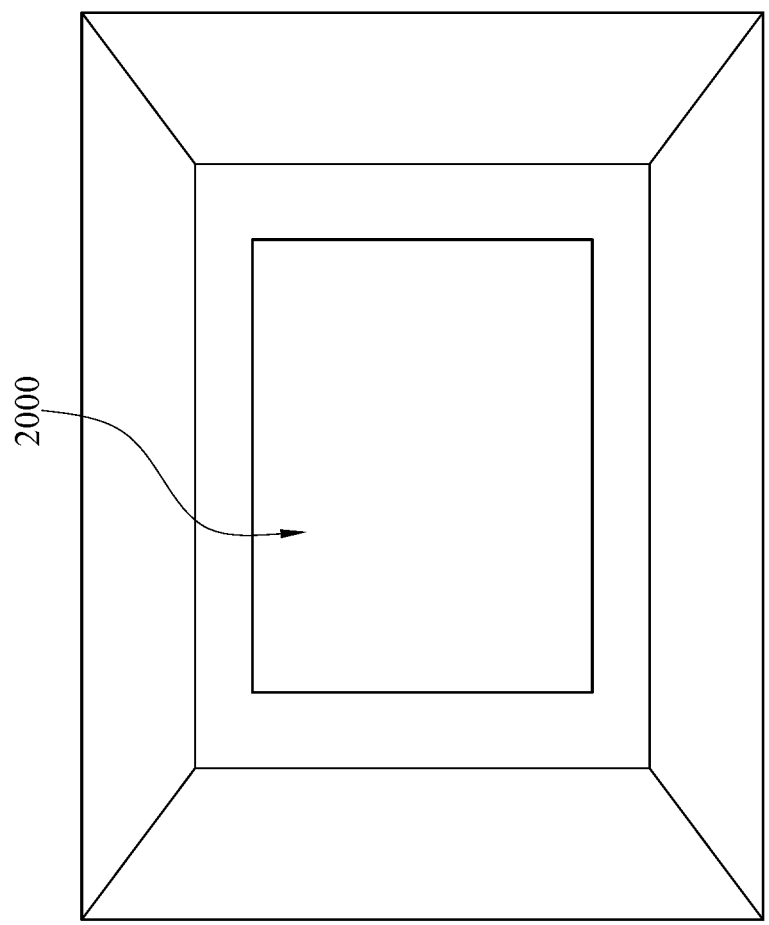
FIG. 5B and FIG. 5C are schematic images, captured by an image capturing device, of two consignments.
Figure 5C:
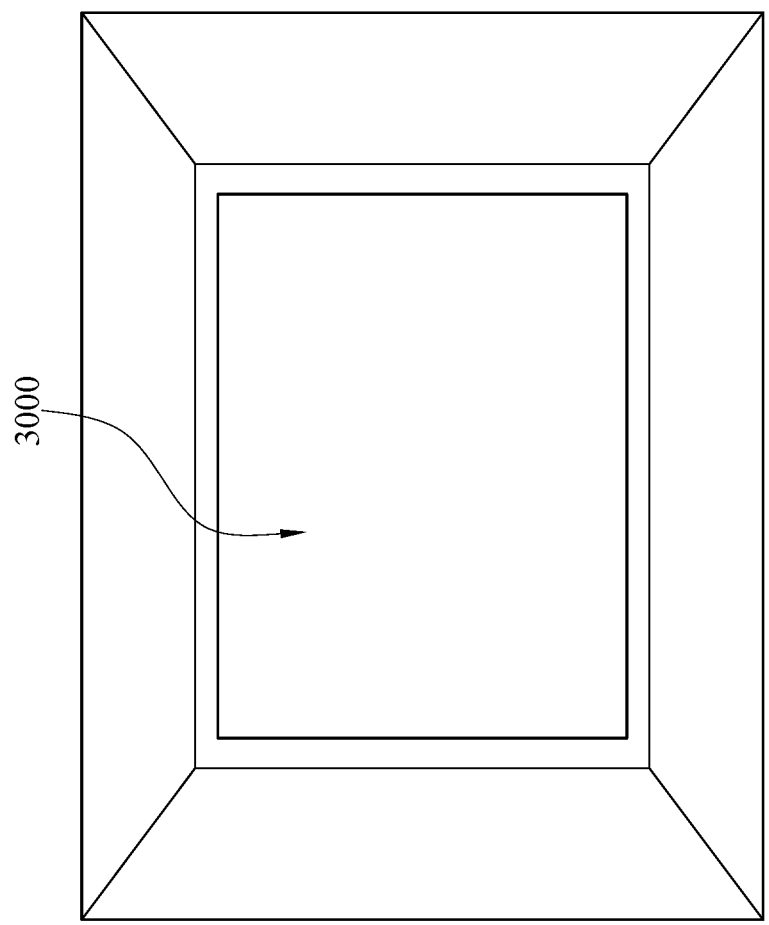

The image capturing device 1320 captures an image from the ceiling 1901 of the volume measurement room 1900 toward the bottom plate 1903 of the volume measurement room 1900. When the consignment 2000 is placed on the bottom plate 1903, if the height H1 of the consignment gets larger, the consignment occupies larger area in the image. Please refer to FIG. 5A to FIG. 5C. FIG. 5A is a schematic diagram of relation between an image capturing device and a consignment in an embodiment of the invention; and FIG. 5B, 5C are schematic images, captured by an image capturing device, of two consignments. As shown in FIG. 5A, in advance, the consignment 2000 is placed at the bottom plate 1903 of the volume measurement room 1900, and the image capturing device 1320 captures the image as FIG. 5B. Then, the consignment 3000 is placed at the bottom plate 1903 of the volume measurement room 1900, and the image capturing device 1320 captures the image as FIG. 5C. The height of the consignment 2000 is H1, and the height of the consignment 3000 is H2. In an embodiment, the length and the width of the consignment 2000 are same as those of the consignment 3000. As shown in FIG. 5B and FIG. 5C, the height H2 of the consignment 3000 is larger than the height H1 of the consignment 2000, and the area occupied by the consignment 3000 in the image (FIG. 5C) is larger than the area occupied by the consignment 2000 in the image (FIG. 5B). In other words, the upper surface area, defined by the length and the width of the consignment 2000/3000. The height of the consignment 2000/3000 may impact on the area occupied by the consignment 2000/3000 in the image. Thereby a conversion formula or a lookup table can be established to indicate the relation among the area of the consignment in the image, the height of the consignment, measured by the rangefinder 1310, and the practical upper surface area of the consignment. In an embodiment, when the controller 1500 receives the image signal captured by the image capturing device 1320, the controller 1500 calculates the length and the width of the image of the consignment, and directly obtains the length and the width of the consignment according to the conversion formula or the lookup table. In another embodiment, the controller 1500 calculates the length width ratio of the image of the consignment, obtains the upper surface area of the consignment according to the conversion formula or the lookup table, and then calculates the length and the width of the consignment according to the length width ratio and the upper surface area. Therefore, the controller 1500 is able to obtain the length, width and height of the consignment by the rangefinder 1310 and the image capturing device 1320. For example, the lookup table contains a number of size ranges. For convenience of calculation, the calculated values in the same size range are considered to be the same certain value.

In an embodiment, the bottom plate 1903 of the volume measurement system 1300 is dark-coloured (e.g. dark blue, brown or black), and the packing of the user's consignment is asked to be light-coloured (e.g. white, yellow or light green). The image, captured by the image capturing device 1320 when no consignment is placed in the volume measurement room 1900, is stored in the controller 1500. When the image capturing device 1320 captures the image including the consignment, the controller 1500 compares the image including the consignment with the image not including the consignment pixel by pixel. Therefore, the different part between two images above is the image of the consignment. The pixel-by-pixel comparison aforementioned is executed by exclusive-OR operation.

Figure 6:
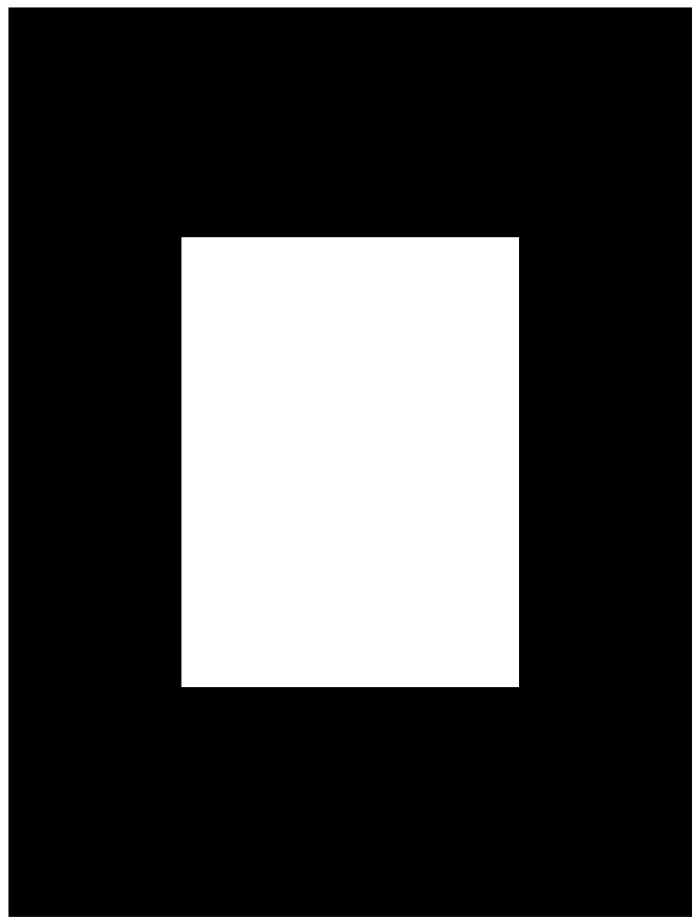
FIG. 6 is a result of binarization of the image in FIG. 5B.

In an embodiment, when the image of the consignment is obtained, it is processed by binarization. The image is separated into the image part of the consignment and the image part out of the consignment. Please refer to FIG. 6, which is a result of binarization of the image in FIG. 5B. The white part in FIG. 6 is the image part of consignment, and the black part is the image part out of the consignment. Then, the controller 1500 executes edge detection according to the binarized image in order to define the border of the image of the consignment 2000. Generally, the consignment is a paper bag or a carton, so that the image of the consignment is rectangle. The controller 1500 defines the length width ratio of the image of the consignment according to the result of the edge detection. Usually, the consignment is placed slantingly at the volume measurement system 1300, so that when the controller 1500 calculates the length width ratio, the controller 1500 finds the pixel position of four corners of the image of the consignment (e.g. rectangle) according to the result of the edge detection, and then calculates the distances among the four corners. Thereby the controller 1500 obtains six distances, and four (two pairs) shortest distances of these six distances are four side lengths of the rectangle.

For example, the pixel positions of the four corners of the obtained image of the consignment 2000 are respectively (100,200), (300,198), (101,300) and (301,298), so that six calculated length are respectively 200.01, 200.01, 100.005, 100.005, 223.618 and 223.618 in the pixel coordinate system. The length and the width of the image of the consignment 2000 are respectively 200.01 and 100.005, and the area of the image of the consignment 2000 is 20002 pixel. The practical area of the consignment, obtained by the aforementioned lookup table, is 800 square centimeter, so that the length and the width of the consignment is deduced that they are respectively 40 cm and 20 cm.

In another embodiment, the invention does not intend to limit the color or the pattern of the box for packing the consignment. Please refer to FIG. 7, which is a lateral view of a volume measurement room (system) in an embodiment of the invention. In this embodiment, the bottom plate 1903 is made up of a white and transparent material. A carrier board 1905 is disposed under the bottom plate 1903 and is used to load the electronic scale 1330. Moreover, one or more light emitting units 1305 are disposed between the carrier board 1905 and the bottom plate 1903. For example, the light emitting unit 1305 is directly disposed on the carrier board 1905 and the light emitting unit 1305 emits green light. The bottom plate 1903 moves up or down following the electronic scale 1330. The image capturing device 1320 captures the first image of the consignment when the light emitting unit 1305 does not emit light, and then captures the second image of the consignment when the light emitting unit 1305 emits light. The controller 1500 recognizes the image of the consignment according to the two captured images. In this embodiment, the controller 1500 compares the first image with the second image pixel by pixel and the same part in these two images is considered the image of the consignment.

Figure 7:
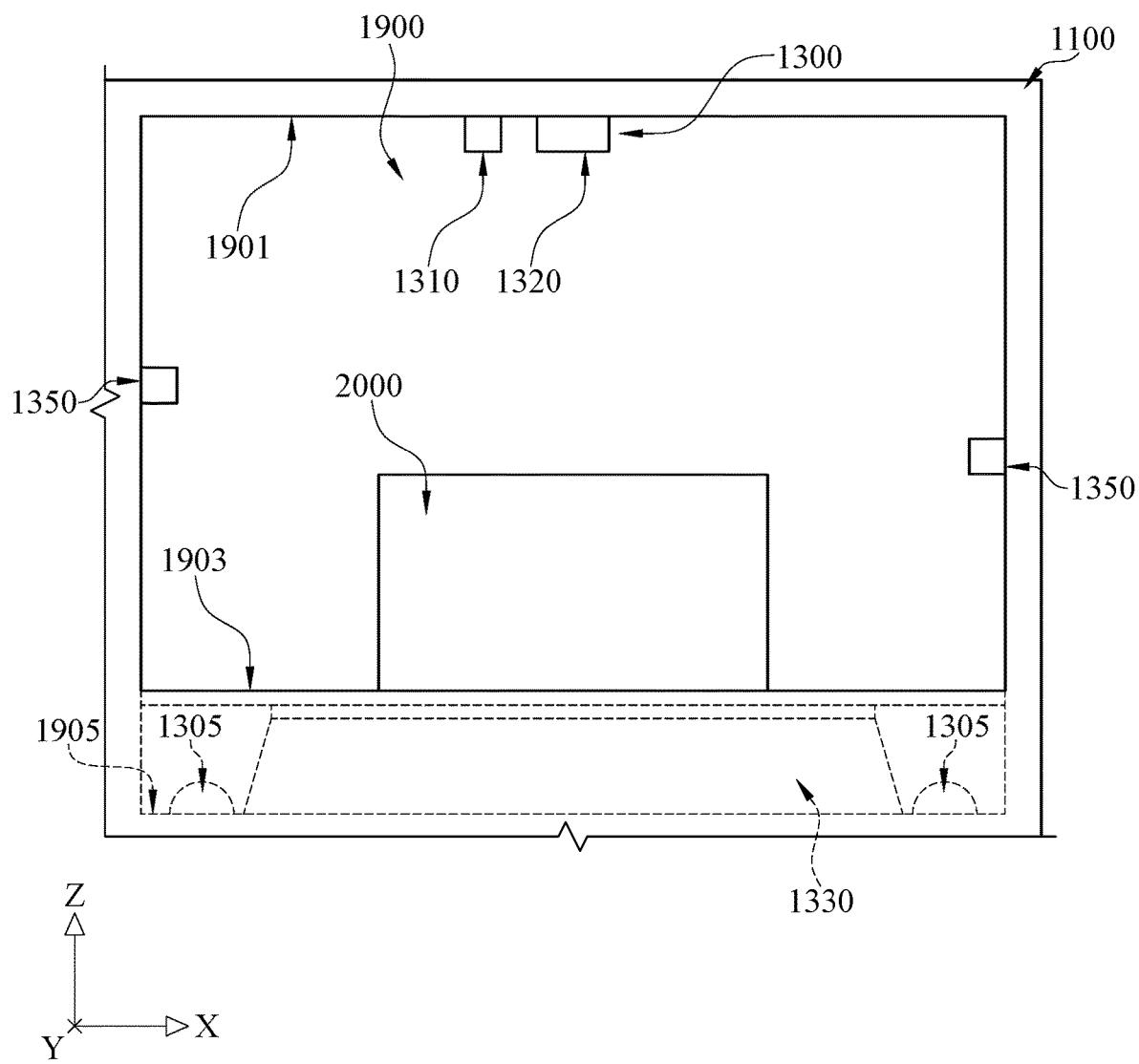
FIG. 7 is a lateral view of a volume measurement room (system) in an embodiment of this invention.

In an embodiment, the volume measurement system 1300 further includes an electronic scale 1330 on the carrier board 1905 to measure the weight of the consignment. Therefore, the controller 1500 is able to calculate a shipping fee according to the length, width, height and weight of the consignment, measured by the volume measurement system 1300. When the volume measurement system 1300 is installed in the volume measurement room 1900, the electronic scale 1330 is disposed on the carrier board 1905 first, and then the bottom plate 1903 is disposed on the electronic scale 1330, as shown in FIG. 7. The bottom plate 1903 is fixed to the electronic scale 1330 but is not fixed to the sidewalls of the volume measurement room 1900. The carrier board 1905 is fixed to the sidewalls of the volume measurement room 1900. By the electronic scale 1330, the displacement of the scale pan (bottom plate 1903) may be ignored so that the measuring error of the height of the consignment 2000 may be reduced.

In an embodiment, by the electronic scale 1330, the controller 1500 is able to determine whether the consignment is placed at the volume measurement system 1300 for measurement of the length, width and height. In an embodiment, when nothing is placed on the bottom plate 1903, the reading number output by the electronic scale 1330 is zero. When the reading number output by the electronic scale 1330 is larger than zero and the reading number remains for a while (e.g. 5 second), the controller 1500 determines an object (i.e. the consignment) is placed on the bottom plate 1903 of the volume measurement system 1300, and start to measure the length, width, height and weight of the object.

In an embodiment, for guarantee of the volume measurement accuracy, the user is restricted from extending his/her hand into the volume measurement system 1300. In an embodiment, when the controller 1500 detects an object (e.g. user's hand) on the edge in the image, the controller 1500 emits an alarm and asks the user to withdraw his/her hand, via the user interface 1400.

Please back to FIG. 4A. In another embodiment, a number of detectors 1350 are disposed at an opening of the volume measurement system 1300. For example, the detectors 1350 is configured to confirm whether an object is at the opening of the volume measurement system 1300 by detects reflected light. When there is an object at the opening of the volume measurement system 1300, the controller 1500 would not control the volume measurement system 1300 to execute the volume measurement.

The user interface 1400 is configured for communication between the user and the controller 1500. As shown in FIG. 2, the user interface 1400 includes an input device such as a touch screen 1410, and a cash register such as a sensor 1420. The touch screen 1410 is configured to display information provided by the controller 1500. For example, the information is the volume measurement result or the calculation result of the shipping fee. Moreover, the touch screen 1410 is also used by the user for inputting, for example, a destination or an assigned arrival time. The sensor 1420 is, for example, configured to pay the fee by a credit card or an easycard. In another embodiment, the sensor 1420 of the user interface 1400 can be replaced with a coin-operated device. In yet another embodiment, the user interface 1400 includes both the coin-operated device and the sensor 1420. In one or more embodiments, the input device has a function, such as Bluetooth or Near Field Communication, so that the user is able to input a number of pieces of shipping information in batches.

In an embodiment, the user interface 1400 further includes a printer 1430, such as a laser printer, an inkjet printer, a thermal printer or other device suitable for print a label sticker. After the user operates the touch screen 1410 for inputting the shipping information (the aforementioned information input by the user), the printer 1430 prints a sticker (label) including the shipping information and the order number given by a logistics business carrier and the user pastes the sticker (label) on the consignment 2000 so that the logistics staff can refer to the sticker (label)

Figure 8:
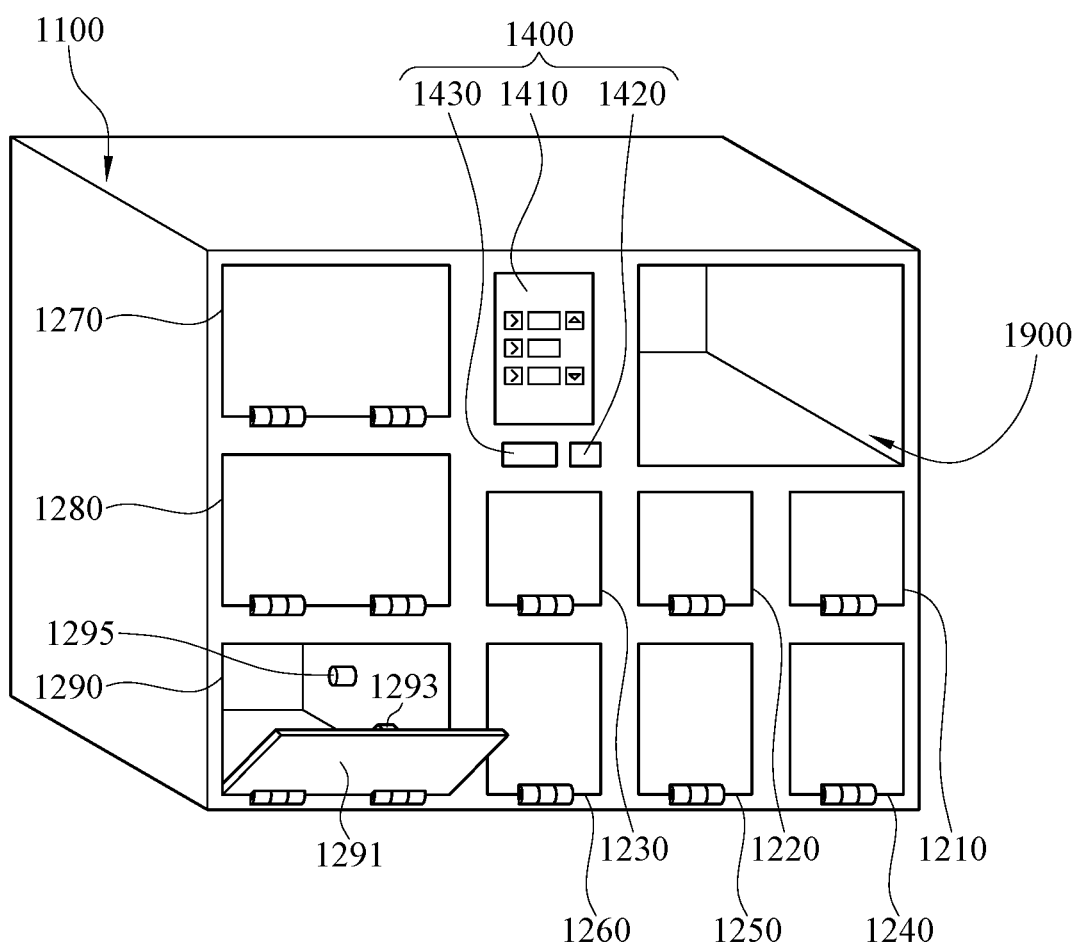
FIG. 8 is a structural diagram of a logistic station in an embodiment of this invention.

Moreover, please refer to FIG. 8, which is a structural diagram of a logistic station in an embodiment of the invention. The structure of the storage boxes can be explained by FIG. 8. The storage box 1290, referred to as an example, has a gate 1291, an electronic lock 1293 and an object detector 1295. Other storage boxes all have the similar components. When the gate 1291 is closed, the controller 1500 is able to control the electronic lock 1293 to lock the gate, so that the consignment stored in the storage box 1290 won't be stolen. The object detector 1295 is configured to detect whether the consignment is placed in the storage box 1290 and inform the controller 1500. In practice, the object detector 1295 is similar to the detector 1350, so the details related to it are not described again.

Figure 9A:
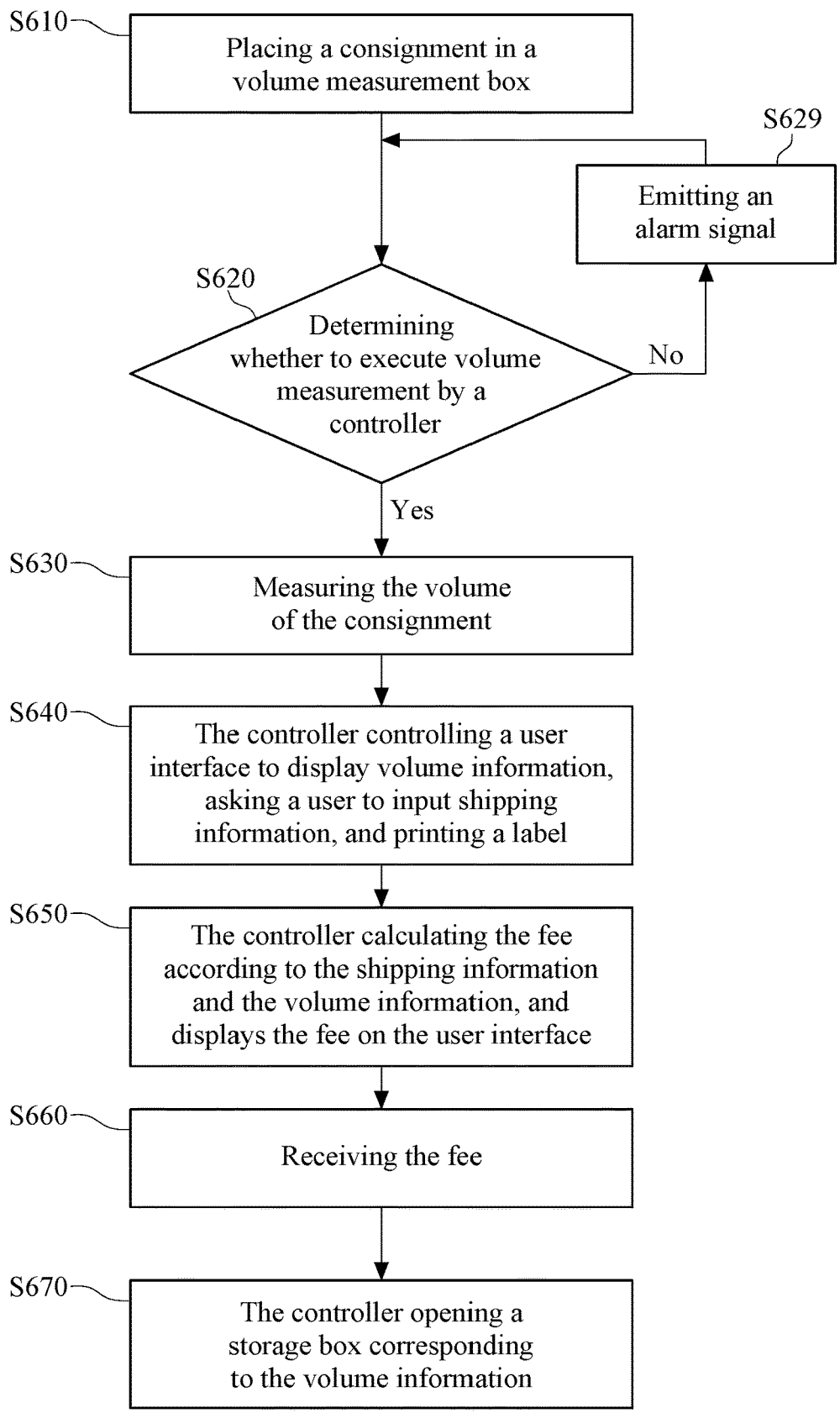
FIG. 9A-9D are operating methods of a logistic station in one or more embodiments of this invention.

The following explains, by one or more embodiments, the operating method of the logistic station. Please refer to FIG. 9A, which is an operating method of a logistic station in an embodiment of the invention. As step S610, the user places the consignment in the volume measurement room 1900. As step S620, the controller 1500 determines whether to execute the volume measurement. For the aforementioned embodiment, if the volume measurement system 1300 has the detectors 1350, the controller 1500 determines to execute the volume measurement when the results from all the detectors 1350 indicate that no object is at the opening of the volume measurement system 1300. When the controller 1500 determines not to execute the volume measurement, as step S629, the controller 1500 emits an alarm signal via the user interface 1400, and continues executing determination until determining to execute the volume measurement, and then as S630, the controller 1500 measures the volume of the consignment via the volume measurement system 1300. Afterward, as step S640, the controller 1500 controls the user interface 1400 to display the volume information (the result of the volume measurement) and asks the user to input the shipping information such as a destination, contact information and/or an assigned arriving time. As the user inputs the shipping information, the printer prints a barcode or a QR code label. The label can be pasted on the surface of the consignment so as to read the information during the following transit. Next, as step S650, the controller 1500 calculates the fee according to the shipping information and the volume information (the result of the volume measurement), and displays the fee on the user interface 1400. Then, as step S660, the controller 1500 controls the sensor 1420 to sense a credit card to receive the fee. In another embodiment, the controller 1500 detects whether the coin-operated device collects the fee. After the fee collection is completed, as step S670, the controller 1500 opens (unlocks) a storage box corresponding to the volume information. The controller 1500 is able to unlock which one of the storage boxes 1210-1290 based on the length, width and height of the consignment included in the volume information. For example, an object detector 1295, which is disposed in each of the storage boxes 1210-1290, is configured to detect whether the consignment is placed in the corresponding storage box and return the information about the detection to the controller 1500 for storing the information. Therefore, when the controller 1500 determines that the consignment can be put into the storage box 1210, the storage box 1220 or the storage box 1230 but the record shows other consignment is already placed in the storage box 1210, the controller 1500 unlocks the storage box 1220. In an embodiment, when the user puts the consignment into the storage box and closes the gate of the storage box 1220, the consignment is completed, and at the same time, the electronic lock of the gate of the storage box 1220 is locked automatically by the controller 1500. In another embodiment, after the user puts the consignment the storage box 1220, the user executes inputting to confirm the consignment is appropriately placed, and then the controller 1500 controls the electronic lock of the gate of the storage box 1220 according to the input of the user. In one or more embodiments, the storage boxes are opened or closed after the completion of the volume measurement rather than the receipt of the fee by the sensor 1420. The controller 1500 controls the storage box, corresponding to the consignment, to open after the volume measurement is completed, and the storage box, corresponding to the consignment, is closed and locked after the user puts the consignment in it and pays the fee.

Figure 9B:
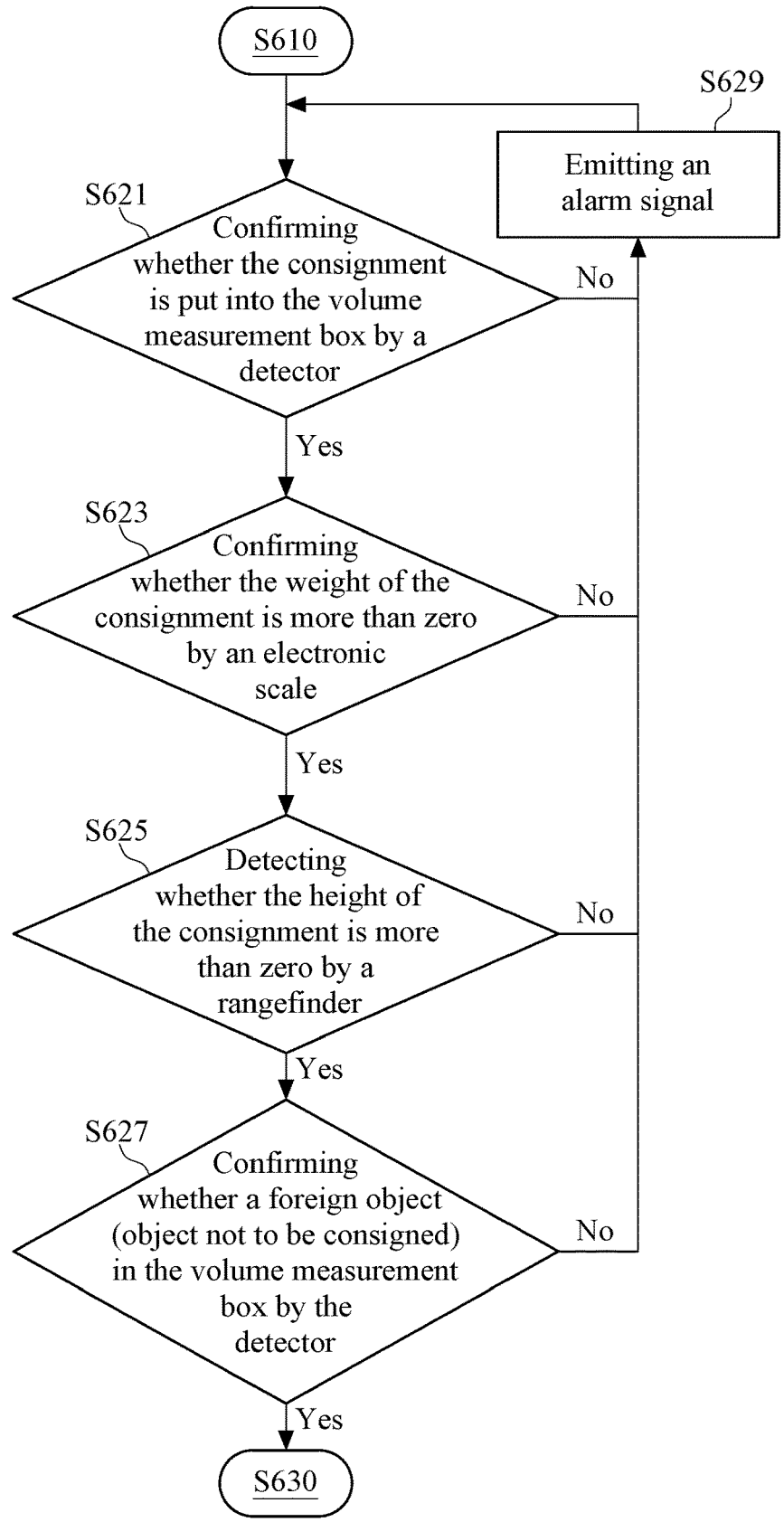

For specific implementation of step S610, please refer to FIG. 9B, which is a flowchart of step S610 according to an embodiment of the invention. As step S621, whether the consignment is put into the volume measurement room 1900 is confirmed by the detector 1350. If the confirmed result is negative, step S629 is performed. On the contrary, if the confirmed result is positive, step S623 is performed. In step S623, whether the weight of the consignment is more than zero is confirmed by the electronic scale 1330. If the confirmed result is negative, step S629 is performed. On the contrary, if the confirmed result is positive, step S625 is performed. In step S625, whether the height of the consignment is more than zero is detected by the rangefinder 1310. If the detection result is negative, step S629 is performed. On the contrary, if the detection result is positive, step S627 is performed. In step S627, whether a foreign object (object not to be consigned) in the volume measurement room 1900 is confirmed by the detector 1350. If the confirmed result is negative, step S629 is performed. On the contrary, if the confirmed result is positive, step S630 is performed.

Figure 9C:
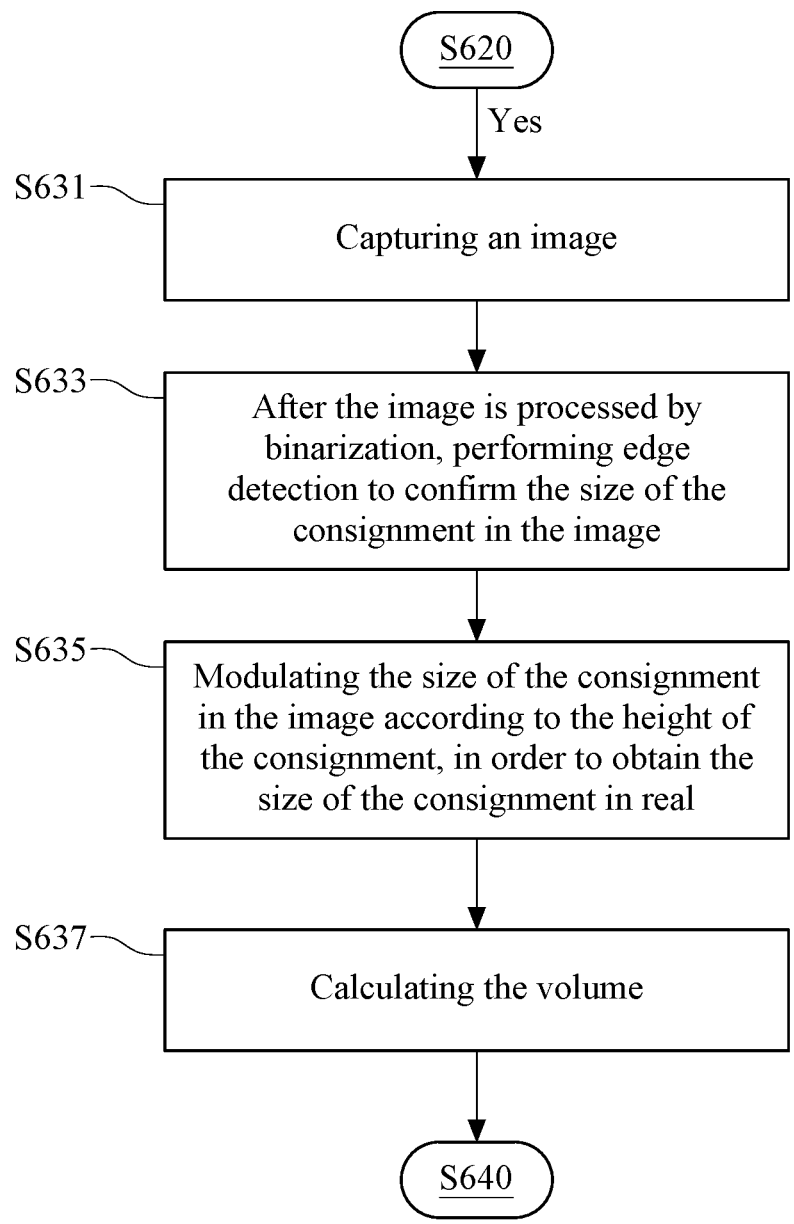

For specific implementation of step S620, please refer to FIG. 9C, which is a flowchart of step S620 according to an embodiment of the invention. As step S631, an image is captured, and then as step S633, the image is processed by the binarization and edge detection is performed to confirm the size of the consignment in the image. Then, as step S635, the size of the consignment in the image is modulated according to the height of the consignment, in order to obtain the size of the consignment in real. Afterward, as step S637, the volume is calculated, and then step S640 is performed.

Figure 9D:
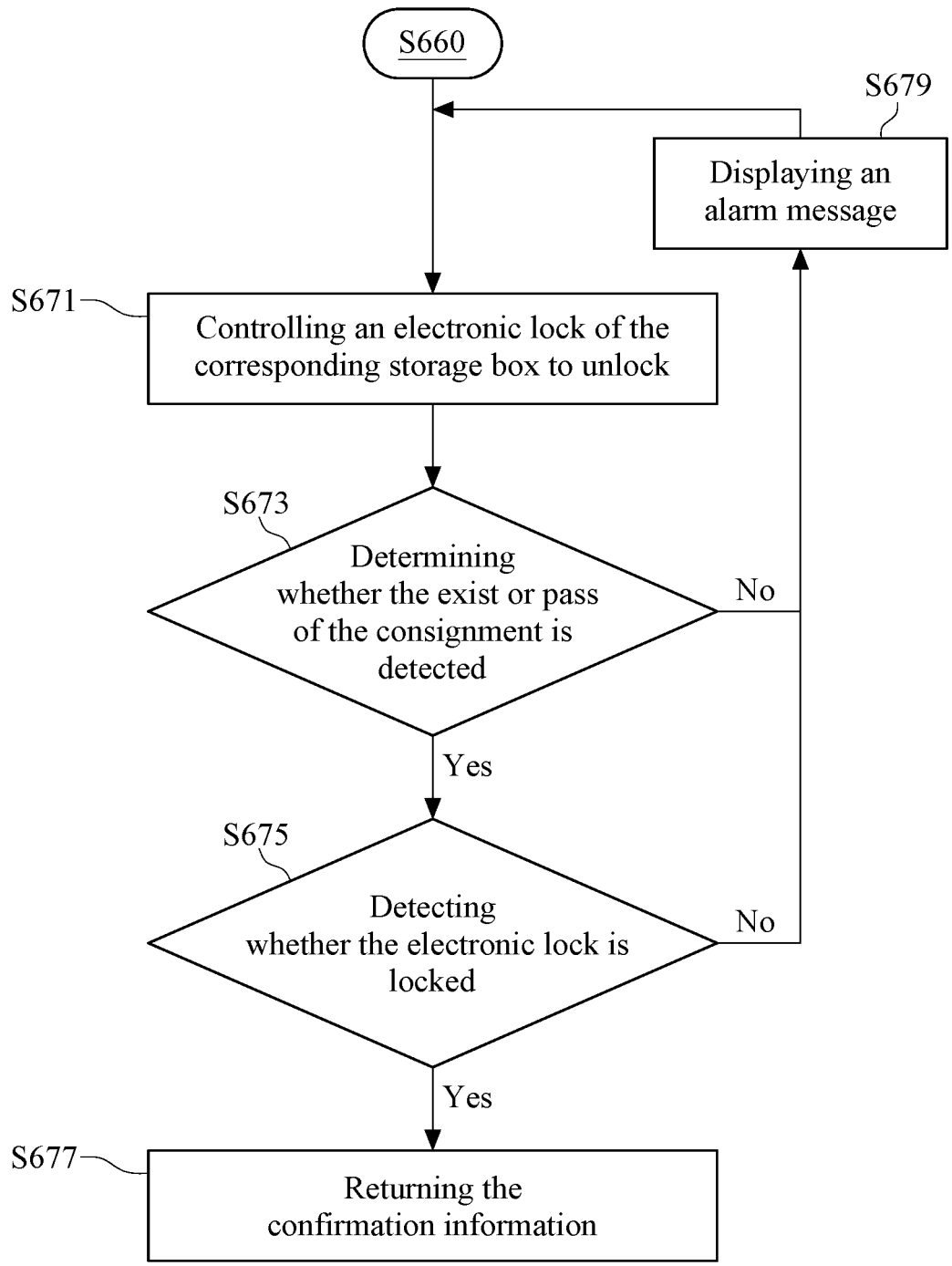

For specific implementation of step S660, please refer to FIG. 9D, which is a flowchart of step S660 according to an embodiment of this invention. As step S671, the electronic lock of the storage box, corresponding to the volume information, is controlled to unlock, and then as step S673, whether the exist or pass of the consignment is detected is determined. If the determined result is negative, as performed in step S679, the alarm message is displayed. If the determined result is positive, as performed in step S675, whether the electronic lock is locked is detected. If the detection result is negative, step S679 is performed. On the contrary, if the detection result is positive, as step S677, the confirmation information is returned to let the user know the procedure of the consignment is completed.

The logistics business carrier installs the logistic station 1000 outside the logistics park/distribution depot, so that the user is able to consign the goods without any time limit, and because the shipping information is input to the logistic station 1000, the logistics business carrier is able to know the shipping information. In an embodiment, the storage boxes 1210-1230 of the logistic station 1000 are already occupied by the consignments, and the user carries a consignment to the logistic station 1000. When the controller 1500 determines this consignment is suitable to be placed in the storage boxes 1210-1230 according to the measurement by the volume measurement system 1300, the controller 1500 displays information on the user interface. The information indicates that the consignment cannot be received. In another embodiment, in the above situation, the controller 1500 opens an available storage box for the user putting the consignment in the available storage box.

In yet another embodiment, the logistic station 1000 further includes a communication device 1600 which is controlled by the controller 1500 and communicates with a remote host of the logistics business carrier. When the controller 1500 determines that the storage boxes with a certain size are all going to be used, the controller 1500 controls the communication device 1600 to inform the remote host. For example, when the storage box 1210 and the storage box 1220 are used and merely the storage box 1230 remains empty, the controller 1500 controls the communication device 1600 to inform the remote host. Therefore, the logistics business carrier is able to promptly arrived the logistic station 1000 to collect the consignment.

In view of the above statement, by the logistic station according to one or more embodiments of the invention, the calculations of the volume and the shipping fee are able to be automatically completed, so that the functions of the logistic station can be provided and the logistics business carriers need not to accredit permanent workers any longer. Therefore, the installment costs of the logistic stations can be decreased.

Although the aforementioned embodiments of this invention have been described above, this invention is not limited thereto. The amendment and the retouch, which do not depart from the spirit and scope of this invention, should fall within the scope of protection of this invention. For the scope of protection defined by this invention, please refer to the attached claims.

SYMBOLIC EXPLANATION 1000, 1000' Logistic station
1100 Cabinet
1210~1290 Storage box
1291 Gate
1293 Electronic lock
1295 Object detector
1300 Volume measurement system
1305 Light emitting unit
1310 Rangefinder
1320 Image capturing device
1330 Electronic scale
1350 Detector
1400 User interface
1410 Touch screen
1420 Sensor
1430 Printer
1500 Controller
1600 Communication device
1900 Volume measurement room
1901 Ceiling
1903 Bottom plate
1905 Carrier board

What is claimed is:
1. A logistic station, comprising:
a cabinet;
a plurality of storage boxes disposed in the cabinet;
a volume measurement room in the cabinet, the volume measurement room having a ceiling and a bottom plate which is opposite to the ceiling and on which a consignment is placed;
a volume measurement system disposed in the volume measurement room, configured to measure volume of the consignment, and comprising:
a rangefinder disposed on the ceiling and configured to measure a height of the consignment; and
an image capturing device disposed on the ceiling and configured to capture at least one image toward the bottom plate;
a user interface disposed in the cabinet and configured to display information and receive shipping information and a shipping fee; and
a controller electrically connected to the plurality of storage boxes, the volume measurement system and the user interface, and configured to calculate an upper surface area of the consignment according to an area of the consignment in the at least one image, generate volume information according to the upper surface area and the height, calculate the shipping fee according to the volume information and the shipping information, and control one of the plurality of storage boxes to open according to the volume information, in order to receive the consignment;

wherein the controller calculates the upper surface area of the consignment according to a conversion formula or a lookup table which is established to indicate a relation among the area of the consignment in the at least one image, the height of the consignment and the upper surface area of the consignment; and wherein the volume measurement system further comprises at least one light emitting unit disposed below the bottom plate which is transparent, the image capturing device is further configured to capture a first image toward the bottom plate when the light emitting unit does not emit light and to capture a second image toward the bottom plate when the light emitting unit emits light, and the controller is further configured to compare the first image with the second image, consider a same part in the first image and the second image belongs to the consignment, and calculate the upper surface area of the consignment according to an area of the same part in the first image and the second image.

2. The logistic station according to claim 1, further comprising a communication device electrically connected to the controller, and controlled by the controller for communication with a remote host, wherein the controller selectively controls the communication device to inform the remote host according to a usage state of the plurality of storage boxes.

3. The logistic station according to claim 1, further comprising a communication device electrically connected to the controller, and controlled by the controller for communication with a remote host, wherein the controller selectively controls the communication device to inform the remote host according to a usage state of the plurality of storage boxes.

4. The logistic station according to claim 1, wherein the volume measurement room further has a carrier board, the volume measurement system further comprises an electronic scale which is disposed on the carrier board and is configured to measure a weight of the consignment, the volume information comprises the height and the weight, and the bottom plate is disposed on the electronic scale to load the consignment.

5. The logistic station according to claim 1, wherein the volume measurement room further has a carrier board, and the at least one light emitting unit is disposed on the carrier board and covered by the bottom plate, and when the light emitting unit emits light, a color of the bottom plate is changed.

6. The logistic station according to claim 1, wherein the user interface comprises a printer configured to print a label according to the shipping information to label the consignment.

7. The logistic station according to claim 6, wherein the user interface further comprises:
an input device electrically connected to the controller, and configured to receive the shipping information; and
a cash register electrically connected to the controller and configured to receive the shipping fee.

8. The logistic station according to claim 7, wherein the input device is a touch screen.

9. The logistic station according to claim 7, wherein the cash register comprises a sensor and/or a coin-operated device.

10. The logistic station according to claim 1, wherein each of the plurality of storage boxes has an accommodating space and comprises:
a gate;
an electronic lock connected to the gate, electrically connected to the controller, and controlled by the controller to lock the gate when the gate is closed; and
an object detector disposed in the accommodating space, and configured to detect whether the consignment is in the storage box, for informing the controller.

11. A consignment method for logistic, applied to a logistic station which comprises a volume measurement system including a transparent bottom plate and at least one light emitting unit disposed below the bottom plate, and comprising:
inputting shipping information and printing a label;
placing a consignment one the bottom plate of the volume measurement system;
measuring a height of the consignment and capturing at least one image of the consignment by the volume measurement system;
calculating an upper surface area of the consignment according to an area of the consignment in the at least one image;
generating volume information of the consignment according to the height and the upper surface area;
calculating a shipping fee according to the volume information and the shipping information;
opening one of a plurality of storage boxes of the logistic station according to the volume information for accommodating the consignment;
confirming whether the shipping fee is received; and
when the shipping fee is received, locking the storage box to complete a consignment process;
wherein calculating the upper surface area of the consignment is performed according to a conversion formula or a lookup table which is established to indicate a relation among the area of the consignment in the at least one image, the height of the consignment and the upper surface area of the consignment;
wherein the step of capturing the at least one image of the consignment comprises:
capturing a first image toward the bottom plate when the light emitting unit does not emit light; and
capturing a second image toward the bottom plate when the light emitting unit emits light; and
wherein the step of calculating the upper surface area of the consignment according to the area of the consignment in the at least one image comprises:
comparing the first image with the second image and considering a same part in the first image and the second image belongs to the consignment; and
calculating an upper surface area of the consignment according to an area of the same part in the first image and the second image.

12. The consignment method according to claim 11, further comprising selectively informing a remote host according to a usage state of the plurality of storage boxes of the logistic station.

13. The consignment method according to claim 11, wherein the measuring the height of the consignment and capturing the at least one image of the consignment by the volume measurement system comprises:
determining whether an object not to be consigned is located at the volume measurement system;

when there is the object not to be consigned located at the volume measurement system, emitting an alarm signal; and when there is no object not to be consigned located at the volume measurement system, measuring the height of the consignment and capturing the at least one image of the consignment.

14. The consignment method according to claim 11, further comprising printing a label according to the shipping information to label the consignment.

15. The consignment method according to claim 11, wherein the volume measurement system further comprises an electronic scale, and the measuring the height of the consignment and capturing the at least one image of the consignment by the volume measurement system is executed according to whether a reading number of the electronic scale is larger than zero.

16. The consignment method according to claim 11, wherein the measuring the height of the consignment and capturing the at least one image of the consignment comprises:

capturing the at least one image of the consignment; and obtaining the area of the consignment in the at least one image according to the captured image and a reference image.

17. The consignment method according to claim 16, wherein the generating the volume information of the consignment according to the height and the upper surface area comprises:

processing the at least one image by binarization;

calculating a length width ratio of the binarizated image;

calculating an area of the binarizated image; and calculating the volume information of the consignment according to the area, the length width ratio and the height.

18. The logistics station according to claim 1, wherein the user interface further comprises:

an input device electrically connected to the controller, and configured to receive the shipping information; and a cash register electrically connected to the controller and configured to receive the shipping fee.

19. The logistics station according to claim 18, wherein the input device is a touch screen.

20. The logistics station according to claim 18, wherein the cash register comprises a sensor and/or a coin-operated device.

* * * * *